(12) United States Patent
Kuchoor et al.

(10) Patent No.: US 11,087,333 B2
(45) Date of Patent: Aug. 10, 2021

(54) FACILITATING SESSION-BASED READ/WRITE OF CONTEXT VARIABLES TO SHARE INFORMATION ACROSS MULTIPLE MICROSERVICES

(71) Applicant: salesforce.com, inc., San Francisco, CA (US)

(72) Inventors: Santhosh Kumar Kuchoor, Dublin, CA (US); Orjan N. Kjellberg, Walnut Creek, CA (US); Jonathan Rico Morales, Dublin, CA (US); Michael Macasek, Pembroke, MA (US); Parvinder Ghotra, Moonachie, NJ (US); Nathan Hess, San Francisco, CA (US); Vartika Vaish, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 194 days.

(21) Appl. No.: 16/526,887

(22) Filed: Jul. 30, 2019

(65) Prior Publication Data

US 2021/0035113 A1 Feb. 4, 2021

(51) Int. Cl.
*G06Q 30/00* (2012.01)
*G06F 16/903* (2019.01)
*H04L 12/58* (2006.01)

(52) U.S. Cl.
CPC ......... *G06Q 30/016* (2013.01); *G06F 16/903* (2019.01); *H04L 51/02* (2013.01); *H04L 51/04* (2013.01); *H04L 51/36* (2013.01)

(58) Field of Classification Search
CPC ....... G06F 16/903; H04L 51/04; H04L 51/36; H04L 51/02; G06Q 30/00; G06Q 30/16
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |

(Continued)

*Primary Examiner* — Sargon N Nano
(74) *Attorney, Agent, or Firm* — LKGlobal | Lorenz & Kopf, LLP

(57) ABSTRACT

The communication system includes a core system having a processor storing user variables representing user-specific information. A messaging system supports communication between a user and an automated bot agent over at least one user-chosen channel employing channel-agnostic context variables. A runtime system mediates a conversation session between user and bot agent, using at least one predefined context variable. A context mapping data store stores a mapping configuration representing a correlation between the channel-agnostic variable of the user-chosen channel and a field in the core CRM system. Using the context mapping data store, the messaging system responds to a communication from the user by querying the context mapping data store to acquire and pass to the runtime system the resolved mapping configuration values corresponding to the user-chosen channel for each defined context variable.

8 Claims, 5 Drawing Sheets

(56) References Cited

U.S. PATENT DOCUMENTS

| | | |
|---|---|---|
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,596,606 B1 * | 3/2017 | Palmer ................. H04W 12/06 |
| 9,866,693 B2 * | 1/2018 | Tamblyn ................. H04L 51/14 |
| 10,038,787 B2 * | 7/2018 | Tamblyn ........... H04M 3/42068 |
| 10,187,337 B2 * | 1/2019 | Smullen ................. H04L 63/18 |
| 10,659,403 B2 * | 5/2020 | Smullen ............... H04L 51/046 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian P et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0082739 A1 * | 3/2014 | Chess ................. G06F 11/0793 726/25 |
| 2015/0379273 A1 * | 12/2015 | Chess ................... G06F 21/577 726/25 |
| 2017/0329786 A1 * | 11/2017 | Chow ................. G06F 16/9535 |
| 2018/0053119 A1 * | 2/2018 | Zeng ..................... G06F 40/295 |

(56) References Cited

U.S. PATENT DOCUMENTS

| | | | |
|---|---|---|---|
| 2019/0215283 A1* | 7/2019 | Nahum | G06F 3/0482 |
| 2020/0074329 A1* | 3/2020 | Sturtivant | G06Q 10/00 |
| 2020/0238514 A1* | 7/2020 | Chinnasamy | B25J 9/0084 |
| 2020/0341970 A1* | 10/2020 | Rodrigues | G06F 16/219 |

* cited by examiner

| Label | Name | Data Type | LiveAgent Channel Field Mapping | LiveAgent OMNI Channel Field Mapping | LiveMessage Channel Field Mapping |
|---|---|---|---|---|---|
| Chat Key | Chat Key | Text | LiveChatTranscript.ChatKey | LiveChatTranscript.ChatKey | Null |
| Routable Id | RoutableId | ID | Null | LiveChatTranscript.Id | MessagingSession.Id |
| End User Id | EndUserId | ID | Null | LiveChatTranscript.LiveChatVisitorId | MessagingSession.MessagingEndUserId |
| Contact Id | ContactId | ID | LiveChatTranscript.contactId | LiveChatTranscript.contactId | MessagingEndUser.ContactId |

FIG. 3

FACILITATING SESSION-BASED READ/WRITE OF CONTEXT VARIABLES TO SHARE INFORMATION ACROSS MULTIPLE MICROSERVICES

TECHNICAL FIELD

The present disclosure relates generally to messaging systems that support chat messages between a user and an automated bot agent.

BACKGROUND

This section provides background information related to the present disclosure which is not necessarily prior art.

Some popular web-based interactive systems and interactive mobile applications offer the ability to support automated messaging communication between a human user and an automated bot agent. Such automated message communication may be found, for example, in customer relationship management (CRM) systems and in social media platforms.

From the viewpoint of the system engineer or computer programmer, adding automated bot agent messaging capability using traditional tools is no simple task. Numerous different data sources need to be knit together in order to provide a user-friendly, natural interaction between the human user and the automated bot agent. For example, in a CRM system, having a natural interaction between human user (customer) and automated bot agent requires the bot to know things like the customer's name (at a minimum) as well as other relevant details, such as what product or service the customer may be calling about and what history of prior calls may be relevant to the current call. This type of information is typically stored in databases administered by the core CRM system.

In addition to certain user-specific information, the automated messaging system also needs to know many technical details about the particular communication channel being used. In this regard, there are quite a few different communication channels in use today, and the number is growing. While there may be some commonality among channels, typically each channel (i.e., messaging system) has its own set of features, bandwidth capabilities, and interfacing requirements. The following are a few examples of different messaging systems in popular use today: Salesforce Live Agent Chat (Live Agent, Live Message), SMS, Facebook Messenger, Apple Business Chat. Even traditional channels like Email can also be used as a mechanism to interact with chatbots.

From the viewpoint of the system engineer or computer programmer, adding automated bot agent messaging capability also requires the messaging system to respect all of the requirements, bandwidth capabilities, and limitations of the chosen messaging system channel. Using current technology, if the engineer or programmer wishes to support two different messaging system channels, then the program code will either have to be written for both or include logic to perform different operations based on the source messaging system.

In addition to potentially doubling or tripling the amount of program coding work to support multiple communication channels, the added system complexity can make the runtime code far more complex and significantly increase the chances for core CRM data or channel-specific data to unwantedly leak into and become stored persistently in the runtime system. This is undesirable because ad hoc information used to support a single conversation between user and bot is not relevant to the runtime system after the conversation is finished; any information that needs to be saved for future use is better stored in the CRM database, which is better engineered to manage this information.

SUMMARY

The interactive computer-implemented communication system technology disclosed here addresses the aforementioned challenges in implementing user-friendly messaging systems that can readily support plural different messaging channels, without the need to hard code the runtime system for each channel, as well as provide a mechanism for the runtime to read and write data back into a CRM data store without the need for the runtime system to maintain a persistent store of CRM data or channel-specific data.

The interactive computer-implemented communication system includes a core system, which may include a CRM system, implemented by at least one processor programmed to maintain a data store of organized to include at least one user variable representing an item of user-specific information. The communication system further includes a messaging system implemented by at least one processor programmed to support message communication over at least one user-chosen channel that supports communication between a communicating user and an automated bot agent and that uses at least one predefined channel-specific variable. In addition, runtime system implemented by at least one programmed processor programmed mediates a conversation session between the communicating user and the automated bot agent, using at least one predefined conversation variable.

To integrate the core system, messaging system and runtime system a context variable data store is implemented by at least one processor programmed to define a computer-readable memory data structure in which to store a mapping configuration representing a correlation between the channel-agnostic context variable and a context mapping of the user-chosen channel a field in the core CRM system.

Using the context mapping data store, the messaging system is programmed to respond to a message communication from the communicating user by initiating at least one query to the context mapping data store to acquire and pass to the runtime system the resolved context variable value based on the mapping configuration corresponding to the user-chosen channel for each defined context variable.

BRIEF DESCRIPTION OF THE DRAWINGS

The drawings described herein are for illustrative purposes only of selected embodiments and not all possible implementations. Thus the particular choice of drawings is not intended to limit the scope of the present disclosure.

FIG. 3 is a table illustrating example standard context variable field mappings for exemplary communication channels;

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Hardware System Architecture

Figure 1:
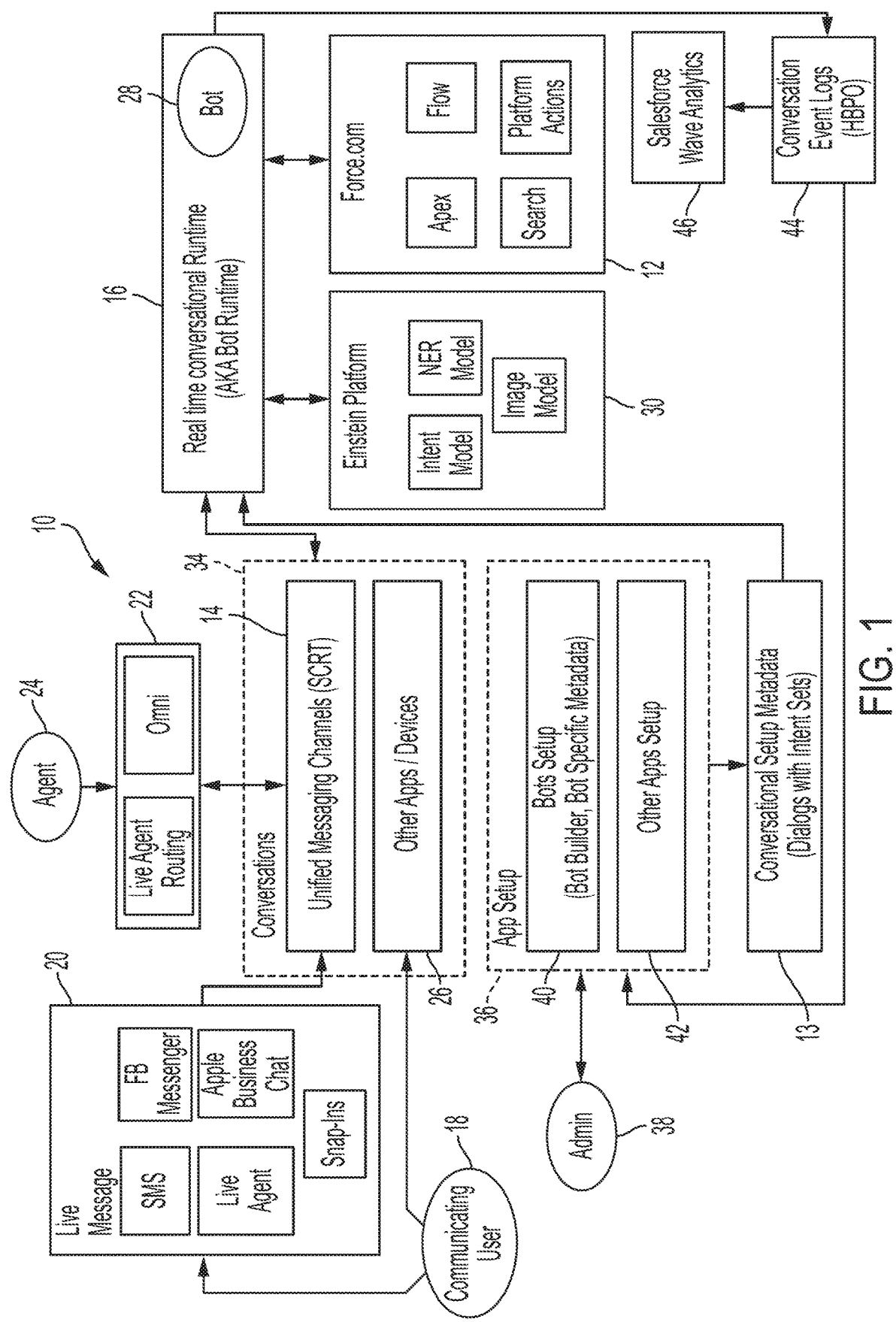
FIG. 1 is a system block diagram of an interactive computer-implemented communication system to support message communication between a communicating user and an automated bot agent.

With reference to FIG. 1, a computer-implemented communication system to support message communication and conversations or dialogs between a communicating user and an automated bot agent is illustrated generally at 10. While various different deployment architectures are possible, one presently preferred architecture uses a microservices implementation. In such implementation, a collection of processors, distributed in a public or private cloud if desired, provide a loosely coupled and independently deployable collection of services. The computer-implemented communication system readily supports a multi-tenant environment where a plurality of tenant users may each use the collection of services independently and without visibility to other tenants. In a typical use case, each of the plurality of tenants may have its own set of end users who utilize the communication services of the system as communicating users.

It will be understood that in a microservices implementation, each of the systems described herein may be implemented by one or more processors, typically cloud-based servers, time-shared among many other users, that have been programmed to perform the services illustrated. In particular, many of the systems described herein may be useful to implement customer relationship management (CRM) systems and platforms such as the Salesforce CRM system and the Force.com platform. Taking advantage of the microservices architecture, each of the various processes implemented by the respective subsystems within the CRM system or platform can be scaled dynamically to suit throughput requirements as needed. Thus a process running on a cloud server to maintain data stores of customer information (e.g., in a CRM database) will often require less processor bandwidth than a cloud server to maintain an active chat session between a communicating user and an automated bot agent. The microservices architecture is well suited for this type of use case, however the principles and advantages of the disclosed technology is by no means limited to a microservices deployment.

As illustrated, the communication system 10 includes a core system 12 that provides a range of CRM services, including storing certain data about each customer that is useful or required to manage a customer relationship (e.g., name of customer, contact information, reason customer made contact, and so forth). The core system can be implemented as a software as a service (SAAS) or as a platform as a service (PAAS). In FIG. 1, the core system 12 is illustrated, by way of example, as comprising a CRM platform, such as the Force.com platform. Other implementations are of course possible, thus it will be understood that the Force.com platform is featured here merely as an example of one possible embodiment.

To assist in providing good customer relationship management, the core system may also include a dialog management software component 13 that is responsible for managing information needed to support certain aspects a conversational dialog within the communication system. For instance, the dialog management component 13 stores conversational setup metadata used to support natural language processor dialogs using intent sets to aid in extracting meaning from a communicating user's request. Intent sets may comprise a set of predefined models corresponding to a set of commonly encountered conversations or dialogs between communicating user and bot. As the conversation or dialog proceeds, the model is populated with user-supplied data that help organize semantic content (meaning) extracted during the conversation.

The communication system also includes a messaging system 14, also referred to herein as a service cloud runtime system (SCRT) that provides a unified platform to support a plurality of different messaging channels 20, where the channels may have similarities and differences from one another in the way they are implemented and in the way they function. Each different messaging channel 20 is configured using data structures and program protocols stored in respective live message modules. In addition, the communication system also includes a runtime system 16 that works in conjunction with the messaging system 14 to support conversational runtime sessions between the communicating user 18 (typically a "customer" within the context of a CRM application and an automated bot agent 28.

When a communicating user 18 requests assistance for which messaging services are available, the messaging system 14 responds by either routing the conversation through the live agent routing component 22 to a live agent 24, or through the runtime system 16 to the automated bot agent 28. The bot agent 28, by virtue of being hosted by the runtime system 16 has access to both the core system 12 and also to other optional platform modules, such as the artificial intelligence analytics platform 30. An example of such an analytics platform is the Einstein platform available from salesforce.com, inc.

As illustrated, the communicating user 18 can also interact with other interactive apps through the provided support module 26. Support module 26 provides support for interactive apps and other devices that the communicating user may wish to employ.

Collectively the SCRT messaging system 14 and the other applications and devices supported at 26 comprise a group of processes that support conversations with the communicating user 18, shown within the dashed box at 34. The communication system 10 also includes a second group of processes, shown by the dashed box at 36, that support interaction with an administrator 38. The administrator uses the bot setup supporting modules 40 to configure how dialogs with the automated bot agent 28 will proceed in response to interaction with the communicating user. Also included in group 36 are a collection of configuration modules by which the administrator configures the other apps and devices 26.

As conversations between the communicating user 18 and the automated bot agent 28 take place, a conversation event log is written to an event log storage data store 44. As with the other modules discussed above, this data store can also be implemented using cloud server technology, where the log read/write mechanism is implemented by a microservice process, if desired. The event log is useful, for example, as a data source for an analytics processor 46.

Conversation Data Model—Context Variables

Figure 2:
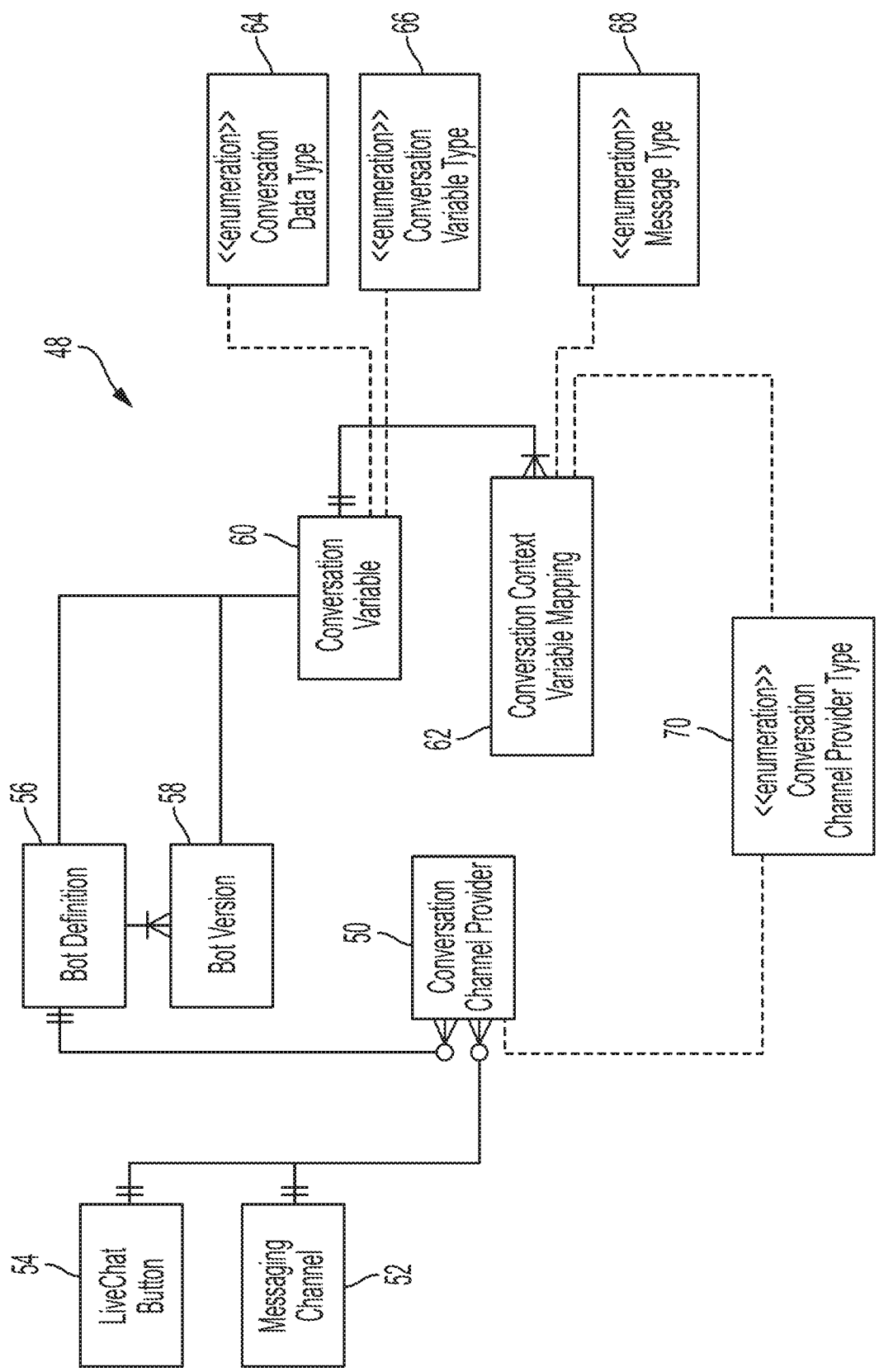
FIG. 2 is a data model diagram illustrating the disclosed conversation context variables and conversation context variable mapping in the context of other data structures used in the interactive computer-implemented communication system.

For a good user experience, it is beneficial for the automated bot agent to have knowledge of the capabilities of particular communication channel being used, and also to have knowledge about the communicating user from information stored in the core system CRM. This is achieved through an innovative use of context variables and context variable mapping that allow the automated bot agent to give a personalized experience (e.g., the bot knows the communicating user's name, products, loyalty level, etc.). The preferred conversation data model 48 to accomplish this is shown in FIG. 2. While other deployment schemes are possible, in one preferred embodiment the conversation data model 48 may be hosted by the core CRM system 12. As will be further explained below, the SCRT messaging system 14 acquires the context variables data structure by making a call to the core system 12.

Context variables essentially function as a proxy for the CRM data. The system provides a mapping to the CRM entity as part of the context variable. In other words, the context variables can be thought of as essentially equivalent to CRM variables when designing dialog flow logic used by the runtime system 16. Thus, one key benefit of context variables is to provide a mechanism that readily supports reading and writing into CRM objects maintained by the core system 12. This makes the job of the administrator 38 much easier when developing and maintaining CRM-aware chatbots. Ultimately this leads to a better experience for end users.

As stated above, context variables will typically be mapping to the underlying fields of the CRM objects into which they will be reading or writing data. The mapping schema will typically be defined by the chatbot administrator. The mappings defined under a context variable for asynchronous messaging channels (e.g., SMS, Facebook, Whatsapp) will typically use a Conversation Session as a starting point, but from there they can be expanded to any aspect that is supported by the CRM. For example, if the Conversation Session has a foreign key to a Contact record, a Chatbot can have a context variable called "Customer Email" that points to a Contact record email by following this relationship in the Context Variable Mapping: Conversation Session->Contact->Contact Email.

By having this mapping, the automated bot agent 28 will have immediate access to the value of the contact's email that started the chat session through the "Customer Email" context variable. This context variable will be resolved automatically when the session starts. Resolving the value of the context variable is done by the messaging system 14, as it will request the mappings for all the context variables used by an automated bot agent 28 before the session starts and will then query the corresponding data in the CRM, passing the resolved values to the chatbot runtime. Similarly, when the chatbot runtime updates the value of one of these variables, the messaging system 14 will be aware of these updates and will update the CRM with the corresponding changes.

Advantageously, the use of context variables provides a layer of abstraction for the underlying channel. That is, for a single context variable the system can have different mappings for each channel type. To illustrate, consider the case where the bot is going to handle a conversation from an Email message. Using the same "Customer Email" context variable described above, the system can have a different context variable mapping for the "Email" channel that starts from Email Message->Contact->Contact Email. This decouples the bot configuration from any channel-specific logic. Thus bot administrators don't need to worry about writing logic to resolves these values depending on what channel is being used.

With reference to FIG. 2, the context variables and context variable mappings are stored in two tables: conversation variable table 60 and conversation context variable mapping table 62, comprising the conversation data model 48. To aid in understanding how these two tables work, the associated tables used to support messaging are also illustrated in FIG. 2, and the data structure details of these associated tables will also be provided below. In each of the table data structures described below, the left-most column provides the name of the data element and the corresponding right-most column provides the data type. Data elements that define linkages between tables are preceded by an asterisk (*).

Conversation Channel Provider Table 50

The conversation channel provider table 50 is preferably implemented according to the following data structure:

| Conversation Channel Provider | |
|---|---|
| Id | PrimaryKey |
| *ConversationConfigId | ForeignKey (Restrict) |
| *ChannelProviderId | ForeignKey (Restrict) |
| ChannelProviderType | ConversationChannelProviderType |
| AgentRequired | Boolean |
| TimeoutInSeconds | Number |

With reference to FIG. 2, the Conversation Channel Provider table 50 is linked to the Id (PrimaryKey) field of the Bot Definition table 56 via the *ConversationConfigId element; and is linked to the Id (PrimaryKey) fields of the Messaging Channel table 52 and the LiveChat Button table 54.

Messaging Channel Table 52

The messaging channel table 52 is preferably implemented according to the following data structure:

| Messaging Channel | |
|---|---|
| Id | PrimaryKey |
| DeveloperName | Name |
| MasterLabel | Text |
| . . . | . . . |

Live Chat Button Table 54

The live chat button table 54 is preferably implemented according to the following data structure:

| Live Chat Button | |
|---|---|
| *Id | PrimaryKey |
| DeveloperName | Name |
| MasterLabel | Text |
| . . . | . . . |

Bot Definition Table 56

The bot definition table 56 is preferably implemented according to the following data structure:

| Bot Definition | |
|---|---|
| *Id | PrimaryKey |
| DeveloperName | Name |
| MasterLabel | Text |
| Description | TextArea |

-continued

| Bot Definition | |
|---|---|
| ActiveVersionId | (Derived) ForeignKey |
| LastVersionNumber | (Derived) Number |
| IconUrl | URL |
| BotMIDomain | ForeignKey (Restrict) |

Bot Version Table 58

The bot version table 58 is preferably implemented according to the following data structure:

| Bot Version | |
|---|---|
| Id | PrimaryKey |
| DeveloperName | Name |
| ... | ... |

Conversation Variable Table 60

The conversation variable table 60 is preferably implemented according to the following data structure:

| Conversation Variable | |
|---|---|
| Id | PrimaryKey |
| *Parent | MasterDetail |
| DeveloperName | Name |
| MasterLabel | Text |
| DataType | ConversationDataType |
| VariableType | ConversationVariableType |

Conversation Context Variable Mapping Table 62

The conversation context variable mapping table 62 is preferably implemented according to the following data structure:

| Conversation Context Variable Mapping | |
|---|---|
| Id | Primary Key |
| *ContextVariableId | MasterDetail |
| ChannelProviderType | ConversationChannelProviderType |
| LiveMessageType | MessageType |
| SObjectType | EnumOrdId |
| FieldMappingFormula | Text |

With reference to FIG. 2, the Conversation Context Variable Mapping table 62 is linked to the
*Parent field of the Conversation Variable table 60 via the *ContextVariableId element.

Conversation data type enumeration 64

The conversation data type enumeration table 64 is preferably implemented according to the following data structure:

| |
|---|
| Text |
| Number |
| Boolean |
| Object |
| Date |
| DateTime |
| Currency |
| ID |

This enumeration table lists all of the possible values for the ConversationDataType field within the Conversation Variable table 60.

Conversation variable type enumeration 66

The conversation variable type enumeration table 66 is preferably implemented according to the following data structure:

| |
|---|
| Variable |
| Context |

This enumeration table lists all of the possible values for the ConversationVariableType field within the Conversation Variable table 60.

Message Type Enumeration 68

The message type enumeration table 68 is preferably implemented according to the following data structure:

| |
|---|
| SMS |
| Facebook |

This enumeration table lists all of the possible values for the MessageType field of the Conversation Context Variable Mapping table 62.

Conversation Channel Provider Type Enumeration 70

The conversation channel provider type enumeration table 70 is preferably implemented according to the following data structure:

| |
|---|
| LiveChat |
| LiveMessage |

This enumeration table lists all of the possible values for the ConversationChannelProviderType field found within the Conversation Context Variable Mapping table 62 and the Conversation Channel Provider Table 50.

Context Variable Mapping Rules

In a presently preferred implementation, internal validation logic is provided to define what objects are accessible per channel type. By way of example, the following represent proposed objects available for each context channel:

LiveAgent:
LiveAgentSession
LiveChatTranscriptLiveMessage
MessagingEndUser
MessagingSession Bot-Specific Standard Context Variables To allow the automated bot agents to work over different channels, the executable code used to implement the automated bot agent will have the capability to seed context variables for each of the supported channels. Illustrated in FIG. 3 are examples of how these context variables would be seeded for each bot-channel configuration. In the table, three exemplary channels have been illustrated, namely: LiveAgent, LiveAgent OMNI, and LiveMessage. Of course other type of channels can be supported as well by simply adding another column to the table.

Conversation Context Sequence

Figure 4:
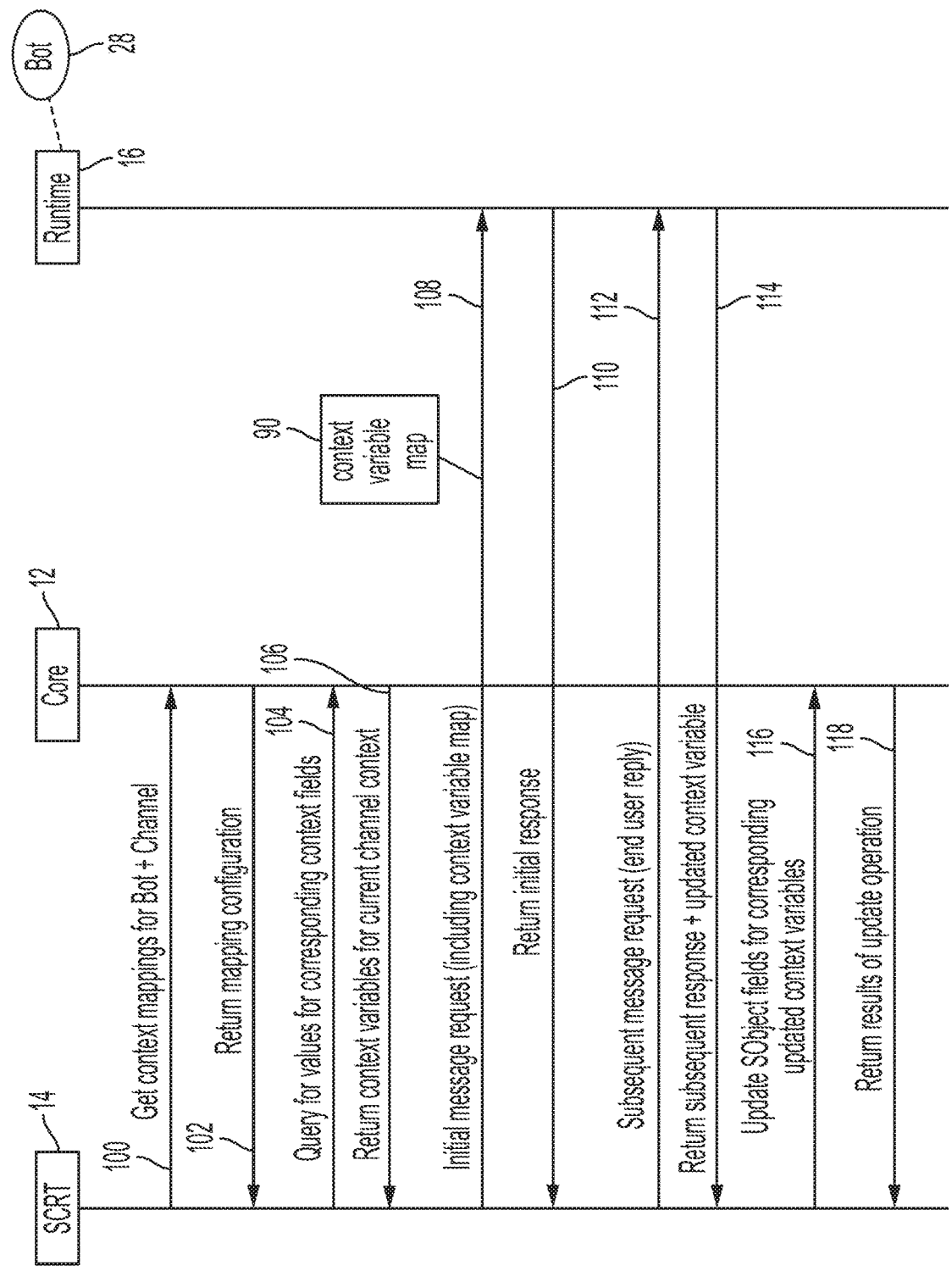
FIG. 4 is a conversation context sequence diagram useful in understanding the manner in which the computer-implemented communication system is programmed and configured to operate.

FIG. 4 illustrates the cooperative workings of the core system 12, storing the CRM variables, the SCRT messaging system 14 and the runtime system 16, supporting the automated bot agent. These systems work cooperatively using the data model illustrated in FIG. 2, as discussed above.

Referring to FIG. 4, when a chat request comes in (e.g., initiated by the communicating user 18 (FIG. 2), the SCRT messaging system 14 at 100 communicates with the core system 12 to get the context mappings for the automated bot agent and for the particular communication channel being used (e.g. as selected from the possible choices available in the live message modules 20). The applicable cached mapping configuration for the specified bot and channel are read and returned to the SCRT messaging system 14 at 102. This process uses the information stored in table 62 (FIG. 2) to ascertain the applicable mapping.

Next the SCRT messaging system 14 at step 102 queries the core system 12 for values corresponding to the context fields, and those values are returned to the SCRT messaging system at step 104. This process uses the information stored in table 60. At this point the SCRT messaging system 14 has the information it needs to construct a context variable map 90, containing the information the runtime system 16 will need to support the requested chat session.

Thus at step 108, the SCRT messaging system 14 transmits its initial message request to the runtime system 16 to allow the automated bot agent mediated by the runtime system to interact with the communicating user. As part of its initial message request, the SCRT messaging system passes the context variable map 90 to the runtime system 16.

After the runtime system 16 has been primed with the context variable map, the chat message dialogue between the automated bot agent 28 and the communicating user 18 can proceed as a series of messages back and forth between the runtime system 16 (on the bot side of the conversation) and the SCRT messaging system 14 (on the user side of the conversation). These message exchanges back and forth are illustrated for example as initial message pairs 108-110, and subsequent message pairs 112-114. These two pairs illustrate two possibilities: an example where the returning response message 110 does not require the core CRM system to be updated, and an example where the returning response message 114 does require the core CRM system to be updated. In the latter case, the SCRT messaging system 14 sends message 116 to the core system 12, providing it with updated context variables which the core system uses to update its corresponding object fields (e.g. SObject fields). After updating, the core system 12 replies back to the SCRT messaging system with message 118, returning the results of the update operation.

From the message flow shown in FIG. 4, it will be apparent that the executable code (within the runtime system 16) needed to implement the automated bot agent 28 does not need to be individually hardcoded to handle each of the different available messaging channels 20, stored as collection live message modules. Rather, the executable code can be written as one generic instance, which is then adapted during runtime to suit the particular type of messaging channel being used. Similarly, the automated bot agent does not need to be hardcoded to utilize specific data fields within the core CRM system, as may be relevant to a particular type of messaging channel being used. The foregoing is made possible because of the conversation data model 48, and in particular because of the manner in which the conversation variable table 60 and conversation context variable mapping table 62 come into play.

From the message flow shown in FIG. 4, it will also be apparent that information extracted during a conversation between automated bot agent 28 and the communicating user 18 can be fed to the core CRM system 12 for persistent storage, without requiring modification of the core CRM system. Again this is made possible because of the conversation data model 48.

The conversation data model 48 effectively decouples any communication channel-specific implementation details and channel-specific data from the bot configuration in the core CRM system. This protects the core bot dialog configuration in the CRM system from becoming polluted with channel-specific details. In addition, the conversation data model allows the respective core CRM system 12, SCRT messaging system 14 and runtime system 16 to operate asynchronously, an aspect that is particularly helpful when implementing the communication system 10 using a microservices architecture. The conversation data model decouples these three systems 10, 12 and 14, so that each can operate within its own individual context of real time—which may be different from the viewpoint of these different systems.

To illustrate, from the viewpoint of the SCRT messaging system, computational resources are consumed primarily when a communicating user submits a chat message and when the automated bot agent responds. From the SCRT messaging system standpoint, performance is perceived as proceeding in real time so long as the system is keeping up with the user-bot dialog. and illustrate, operating in real time. During much of the user-bot dialog, it should not be necessary to update core CRM values. Updates to the core CRM system will typically occur, for example, at the end of the communication session between user and bot.

Figure 5:
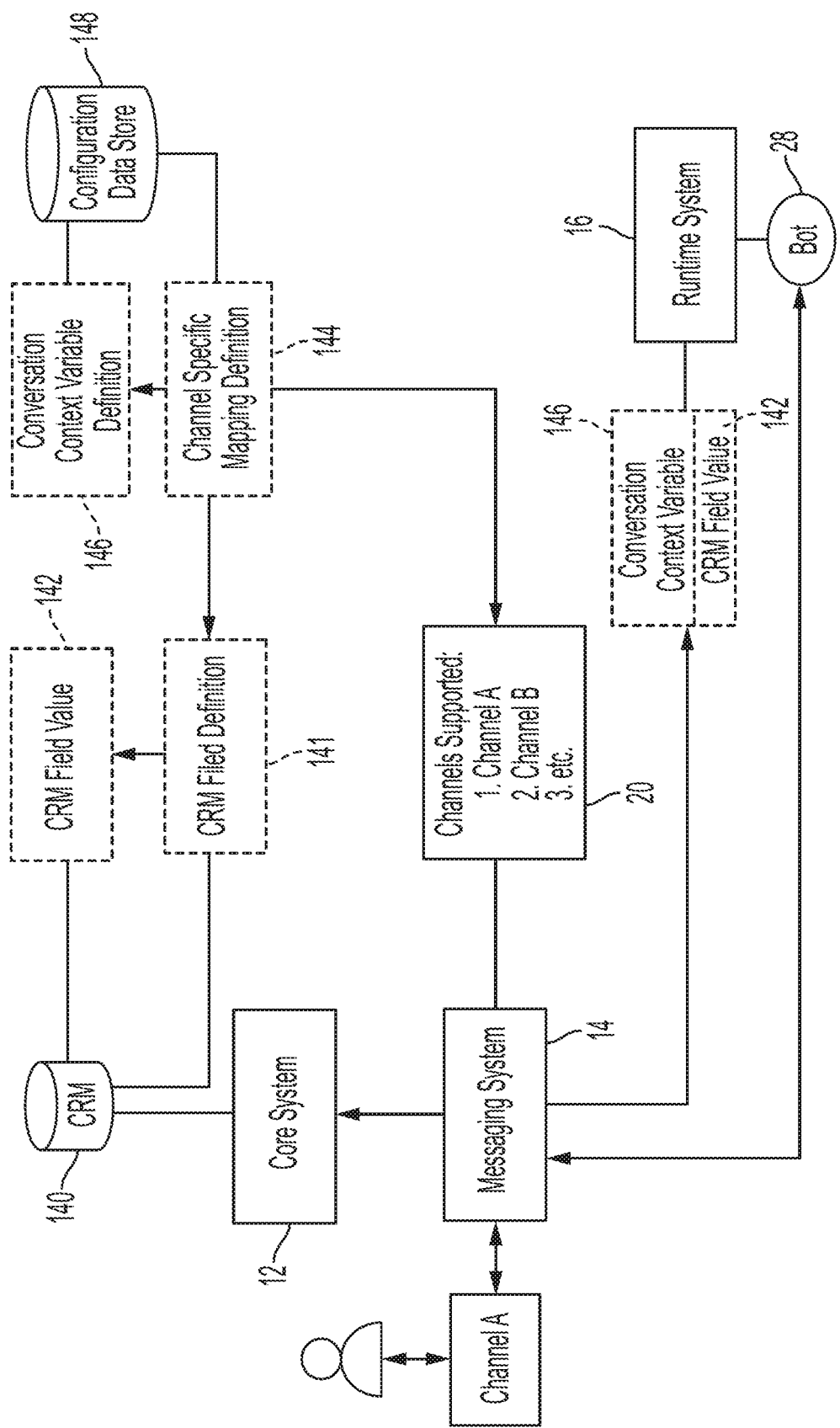
FIG. 5 is a data flow diagram useful in understanding how the conversation data model works

From the foregoing, it will be appreciated that the conversation data model 48 allows the respective core system 12, messaging system 14 and runtime system 16 to operate in a very flexible manner, which has been summarized in FIG. 5. As illustrated, the core system 12 is responsible for maintaining a database of persistent information, such as user information, stored in the CRM database 140. By way of illustration, CRM field value 142 represents an exemplary element of user-specific information stored according to the CRM field definition 141 in CRM database 140.

The messaging system 14, with its collection of supported messaging channels 20, operates using channel-agnostic variables, mapped according to the channel specific mapping definition at 144. The runtime system 16, supporting at least one automated bot agent 28, can be configured to use conversation context variables 146 based on the mapping definition 144.

The conversation data model 48 binds these three key systems together, by providing a vehicle to map CRM field values 142 from the CRM database 140 to the conversation context variables 146 used by the runtime system 16. Likewise the conversation data model 48 provides a vehicle to map channel-agnostic context variables 144 of the messaging system with the conversation context variables 146 of the runtime system 16.

In the exemplary embodiment described above, the conversation data model 48 was illustrated as being stored in the core system 12. While this arrangement is effective, in the more general case the conversation data model 48 could be supported by a system operating independently from the core system 12. The conversation data model 48 could, for example, be hosted by a cloud-based server that is not necessarily bundled with the core system and the CRM database. Thus in FIG. 5, the conversation data model 48 has been illustrated as a configuration data store 148, with the understanding that this data store 148 could be hosted by the core system 12 (as illustrated above) or by some other cloud-based server system or dedicated server system, such as a company-specific server system.

Furthermore, in the exemplary embodiment described above, the conversation data model 48 was implemented using two tables, a conversation variable table 60 and a conversation context variable mapping table 62 (both shown in FIG. 2). While this two-table arrangement is effective, other table arrangements are possible. Thus in FIG. 5 the conversation data model 48 is illustrated as a more generalized context mapping configuration 150 having a component that stores a mapping configuration 152 that stores a correlation between the channel-specific variables of the user-chosen channel (at 152) and the conversation variables used by the runtime system (at 156). In addition, the conversation data model 48 also includes a user variable structure (at 158) used to pass the user variable data 142 (from CRM 140) to the conversation variable 146 (consumed by the runtime system 16).

In use, the messaging system 14 determines what specific messaging channel 20 has been selected at the outset of the conversation sequence. This channel selection implies certain channel-specific variables 144 are in play. This channel selection, in turn defines which channel specific context mapping configuration shall be used, and this, in turn, selects the conversation variables that map to the user variables 158 by which user variable data values 142 are passed as conversation variables 146 to the runtime system 16.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

What is claimed is:

1. An interactive computer-implemented communication system, comprising:
   a core system implemented by at least one processor programmed to maintain a data store of organized to include at least one user variable representing an item of user-specific information;
   a messaging system implemented by at least one processor programmed to support message communication over at least one user-chosen channel that supports communication between a communicating user and an automated bot agent and that uses at least one predefined channel-agnostic context variable;
   a runtime system implemented by at least one processor programmed to mediate a conversation session between the communicating user and the automated bot agent, using at least one predefined context variable;
   a context mapping data store implemented by at least one processor programmed to define a computer-readable memory data structure in which to store a mapping configuration representing a correlation between the channel-agnostic context variable and a context mapping of the user-chosen channel and a field in the core system
   wherein the messaging system is programmed to respond to a message communication from the communicating user by initiating at least one query to the context mapping data store: (a) to acquire and pass to the runtime system the mapping configuration corresponding to the user-chosen channel and (b) to acquire and pass to the runtime system the user variable corresponding to the communicating user.

2. The communication system of claim 1 wherein the context mapping data store is implemented by at least one processor associated with the core system.

3. The communication system of claim 1 wherein the context mapping data store includes a data structure defining a conversation context variable mapping table that stores correlations between the channel-specific variable and the conversation variable.

4. The communication system of claim 1 wherein the context mapping data store includes a data structure defining a conversation variable table that stores the user variable.

5. The communication system of claim 3 wherein the messaging system acquires an instance of the conversation context variable mapping table in response to initiation of a message communication from the communicating user.

6. The communication system of claim 4 wherein the messaging system acquires user-specific information in response to initiation of a message communication from the communicating user and stores the acquired user-specific information as user variable data in the conversation variable table.

7. The communication system of claim 1 wherein the at least one processor programmed to implement the runtime system is further programmed to communicate with the core system to update the at least one user variable maintained by the core system data store.

8. The communication system of claim 1 wherein the at least one processor programmed to implement the runtime system is further programmed: (a) to evaluate the user variable stored in the context mapping data store, and (b) to selectively communicate with the core system to update the at least one user variable maintained by the core system data store based on the evaluation.

* * * * *